United States Patent [19]

Kraus

[11] Patent Number: 5,651,634
[45] Date of Patent: Jul. 29, 1997

[54] CONNECTION BETWEEN A SUPPORT AND A PLATE ELEMENT

[75] Inventor: Willibald Kraus, Grunstadt, Germany

[73] Assignee: TRW United Carr GmbH & Co. KG, Enkenbach-Alsenborn, Germany

[21] Appl. No.: 590,018

[22] Filed: Jan. 25, 1996

[30] Foreign Application Priority Data

Feb. 13, 1995 [DE] Germany ............... 19 504 692.7

[51] Int. Cl.⁶ .................................................. F16B 21/08
[52] U.S. Cl. ........................... 403/408.1; 403/405.1; 411/508; 411/510; 411/908
[58] Field of Search ................... 24/662, 297, 292, 24/614–616; 403/405.1, 407.1–408.1; 411/508–510, 908

[56] References Cited

U.S. PATENT DOCUMENTS

| | | |
|---|---|---|
| 4,505,611 | 3/1985 | Nagashima et al. . |
| 4,810,147 | 3/1989 | Hirohata ..................... 411/508 X |
| 4,867,599 | 9/1989 | Sasajima . |
| 5,038,444 | 8/1991 | Gordon . |
| 5,106,223 | 4/1992 | Kraus . |
| 5,297,322 | 3/1994 | Kraus . |
| 5,507,610 | 4/1996 | Benedetti et al. ............ 24/297 X |

FOREIGN PATENT DOCUMENTS

| | | |
|---|---|---|
| 0432855 | 6/1991 | European Pat. Off. . |
| 4014589 | 8/1991 | Germany . |

*Primary Examiner*—Anthony Knight
*Attorney, Agent, or Firm*—Fay, Sharpe, Beall Fagan, Minnich & McKee

[57] ABSTRACT

A connection between a support, specifically a part of a motor vehicle body, and a plate element, specifically a door panelling, comprises an upper part attachable to the plate element via an attachment zone and a contact zone for a holding piece, which is joinable with the support. The contact zone of the upper part comprises two pockets arranged one above the other and separated by a cross-piece. The holding piece is equipped above the attachment zone with two flanges having differing elasticity arranged at an axial distance cross-wise to the longitudinal direction. The flanges are insertable into the pockets of the upper part.

18 Claims, 2 Drawing Sheets

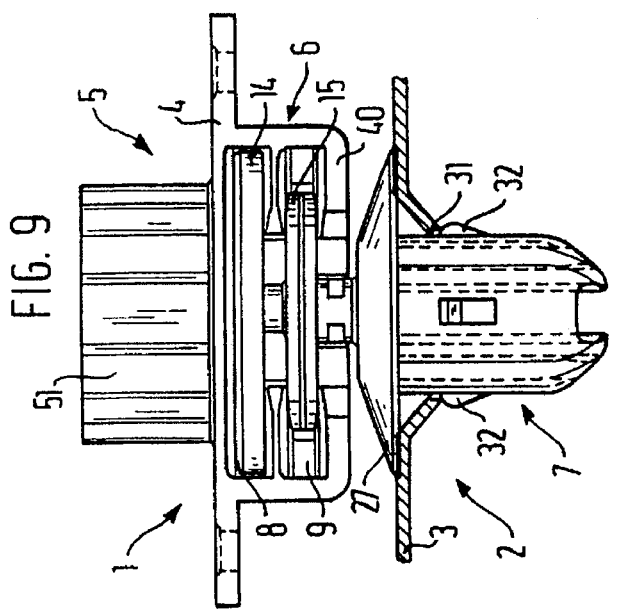
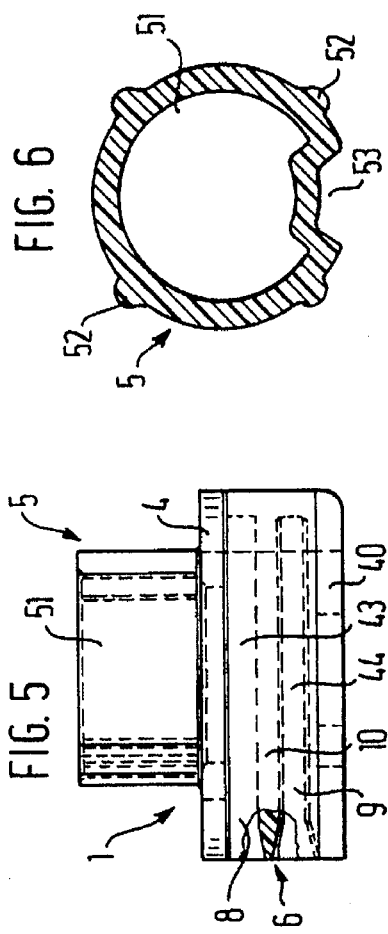
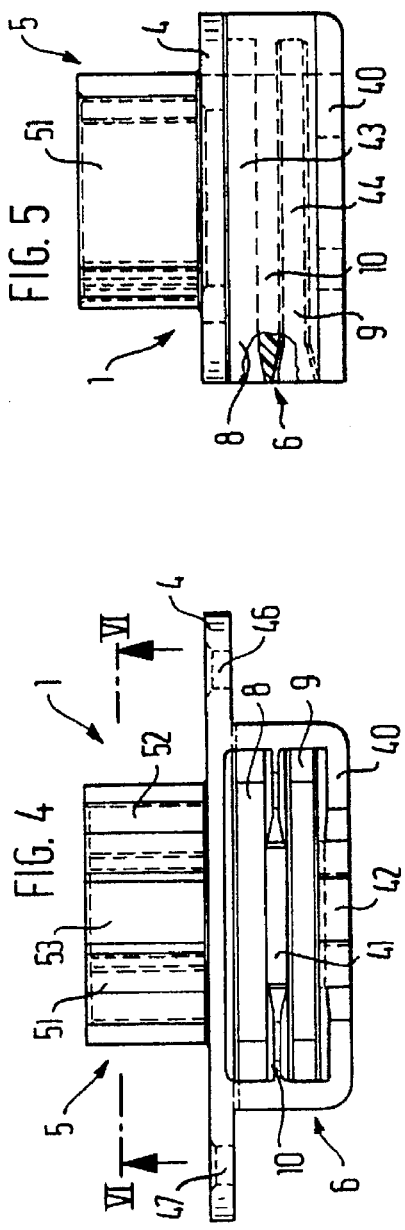
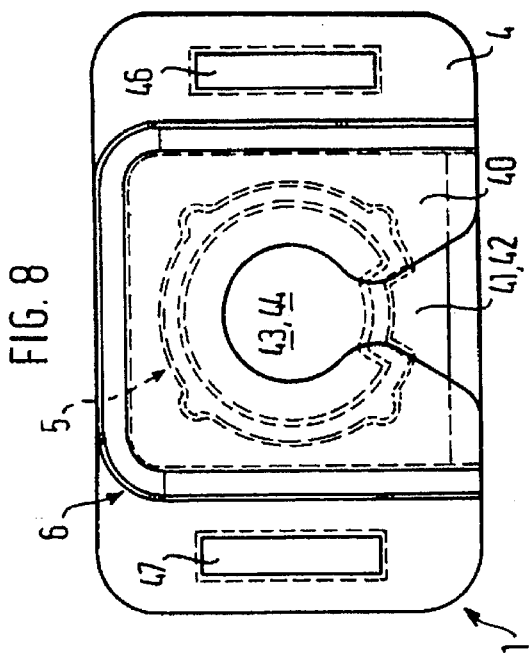
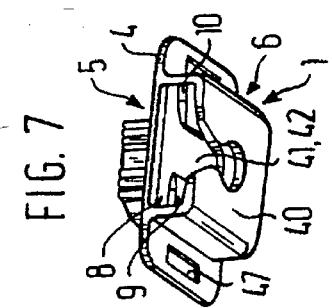

5,651,634

CONNECTION BETWEEN A SUPPORT AND A PLATE ELEMENT

BACKGROUND OF THE INVENTION

The subject invention relates to a connection between a support, for example, a part of a motor vehicle body, and a plate element, for example, a door panelling. The connection broadly comprises an upper part attachable via an attachment zone and a contact zone for a holding part which is connectable with the support.

It has been suggested that a connection element of the type referred to above can be designed in such manner that the upper part has a wall with locking ribs on the interior that can be embedded in cooperating locking ribs arranged at the head piece of the holding element (German Patent 43 30 102.9-24). With such a construction, there exists significant tolerance compensation in the direction of the longitudinal axis of the connection element.

The prior art also includes a connection with an upper part attachable to a plate element, a center part, and a holding element (see DE 40 14 589 C1 corresponding to U.S. Pat. No. 5,106,223). With such a construction, a tolerance compensation, required specifically in the motor vehicle industry, is generally only possible in the plane which extends parallel to the support, i.e., transverse to the longitudinal axis of the connection element.

It is the object of the present invention to design a connection of the above-discussed type such that, in addition to improved ease of installation, increased tolerance compensation is achieved, particularly in the motor vehicle industry with respect to attachment of motor vehicle door panelling that are subjected to significant temperature stresses.

The object is achieved according to the invention in that the contact zone of the upper part consists of two pockets arranged above one another and are separated by a crosspiece. The cooperating holding piece is fitted above its support connectable attachment zone with two axially spaced flanges insertable in the pockets transverse to the longitudinal direction with the flanges having different elasticities.

Due to the combination of the noted characteristics of the connection system according to the invention, there results the benefit of simple installation as a result of the lateral insertion of the holding piece into the pockets. Moreover, cause of the specific design of the pockets and the flanges, further improvement of the attachment results especially when used for joining a door panelling to a body part of a motor vehicles wherein temperature cycling takes place.

The attachment zone can be designed as an anchor or a cylinder base having elastic locking elements which are embeddable behind an aperture of a support member. Above the attachment zone there may be a circumferential, elastic sealing lip which is joined to flanges via joining necks. In such an arrangement, the lower flange may be a rigid plate, whereas the upper flange may be equipped with an elastic center zone. The elasticity of the center zone may, for example, be produced via spirally-wound arms which connect with an outer ring.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein:

Hereinafter, the invention is explained in more detail, using an exemplary embodiment represented in the drawing wherein:

FIG. 4 is an elevational view of the upper part that joins with the holding piece of FIG. 1;

FIG. 5 is a lateral view of the upper part of FIG. 4;

FIG. 6 is a cross-sectional view taken on line VI—VI of FIG. 4;

FIG. 7 is a perspective view of the upper part of FIGS. 4 and 5;

FIG. 8 is a bottom view of the upper part of FIG. 4; and,

FIG. 9 is an elevational view showing the connection according to the invention with the upper part and the holding piece joined to each other and mounted in a support aperture (FIG. 9 represents a connection according to the invention between a support 3, specifically a body part of a motor vehicle, and a plate element (not shown), specifically a door panel).

DETAILED DESCRIPTION OF THE PREFERRED EMBODIMENT

Figure 1:
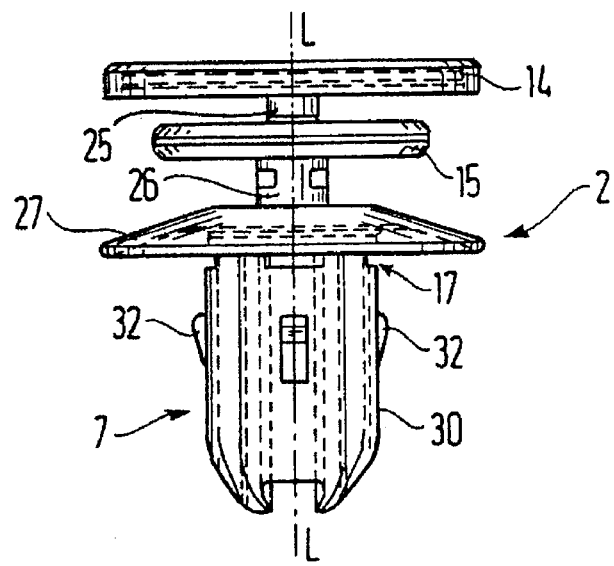
FIG. 1 is an elevational view of a holding piece formed in accordance with the invention.

Referring now to the drawings wherein the showings are for the purposes of illustrating the preferred embodiment of the invention only and not for purposes of limiting same, as best seen in FIG. 9, the connection comprises two parts, namely an upper part 1 and a holding piece 2.

Figure 2:
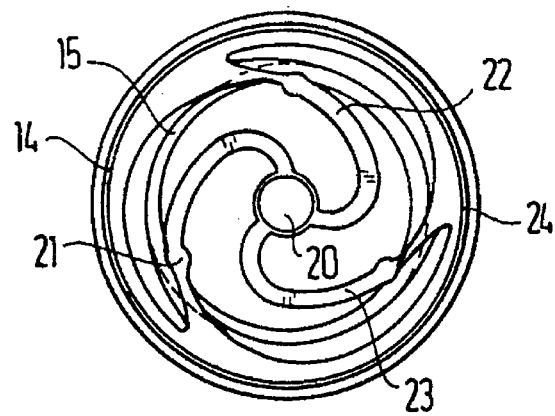
FIG. 2 is a top plan view of the holding piece of FIG. 1.
Figure 3:
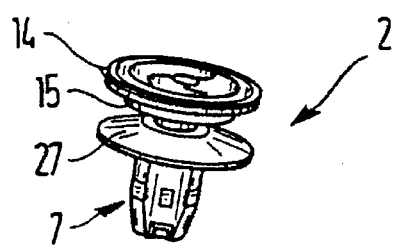
FIG. 3 is a perspective view of the holding piece of FIG. 1.

FIGS. 1 to 3 show the holding piece 2, whereas FIGS. 4 to 8 show the upper part 1.

According to FIG. 1, the holding piece 2 basically comprises a lower attachment zone 7 and an elastic sealing lip 27 with two flanges 14 and 15 located thereabove. Between the two flanges 14 and 15 there is a first connection neck 25 and between flange 15 and the sealing lip 27 there is a second connection neck 26.

The attachment zone 7 is designed, for example, as an anchor or a cylinder base having resilient or elastic locking elements 32. Between the upper zone of the locking elements 32 and the underside of the sealing lip 27 there is provided a storage zone 17. Because of the connection necks 25 and 26, the two flanges 14 and 15 are spaced at a distance from each other in the axial direction L—L. The lower flange 15 is a rigid plate design, whereas the upper flange 14, according to FIG. 2, is equipped with an elastic center section or zone 20. In the preferred form, the center zone 20 is connected with an outer ring 24 via spirally-wound arms 21, 22, and 23. The outer ring 24 thus has the ability to shift in radial directions relative to the axis L—L.

As is evident from FIG. 1, the upper flange 14 has a larger diameter than the lower flange 15. The connection neck 26 like has a larger diameter than the connection neck 25. Both necks are preferably of cylindrical shape.

The upper piece 1 represented in FIGS. 4 to 8 is basically comprised of an attachment zone B and a contact zone 6. The contact zone 6, according to FIG. 8, has rectangular outer form and defines two pockets 8 and 9 which are separated from each other by a cross-piece 10. The lower pocket 9, according to FIG. 4, is limited at its lower side by a plate 40.

The cross-piece 10 and the plate 40, as seen in FIGS. 7 and 8, define respective insertion slots 41, 42 for the connection necks 25 and 26 of the holding piece 2 represented in FIG. 1. It is also apparent from FIG. 8 that there exists behind the insertion slots 41 and 42 respective apertures 43 and 44 of significantly larger diameter. The diameters of these apertures are also preferably significantly larger than the diameters of the connection necks 25, 26 for reasons that will become apparent. It is apparent from FIG. 5 that the insertion slots 41 and 42 is designed as a conically tapering entrance zone so that easy installation will result with lateral insertion of the holding piece 2 into the upper piece 1.

A plate 4 is positioned between the contact zone 6 and the attachment zone 5 (see FIGS. 4 and 8). The shape of the plate is rectangular and it is provided with longitudinal recesses 46 and 47 on both sides of the rectangular contact zone 6. The rectangular plate 4 is joined with the attachment zone 5 which, as shown in FIGS. 4 and 6, is designed as a hollow cylinder. At the outer circumference of the hollow cylinder, there are longitudinal ribs 52 and a longitudinally extending traversing recess 53.

Because of the insertion slots 41 and 42 in the contact zone 6 of the upper part 1, it is possible, when installing the connection according to the invention, to slide the holding piece 2 laterally into the upper part 1 in such manner that the flanges 14 and 15 embed themselves in the corresponding pockets 8 and 9, as shown in FIG. 9. As apparent from FIG. 9, the upper pocket 8 of the contact zone 6 can have a greater height than the thickness of the upper flange 14 of holding piece 2, while the lower pocket 9 has the approximate thickness of the lower flange 15. Thus, there results, because of the elasticity of the upper flange 14 and the space between the front surface of plate 40 and the upper side of the sealing lip 27, overall, a satisfactory tolerance compensation in the longitudinal direction.

The connection according to the invention comprised of upper part 1 and holding piece 2 can, according to FIG. 9, be installed in an aperture 31 of support 3. The aperture has, for instance, according to FIG. 9, a dish-shaped form. In this arrangement, the sealing lip 27 places itself over the dish-shaped form of the aperture 31 of support 3 and guards against the entry of dirt.

After installation has been completed in accordance with FIG. 9, there now exists the possibility to fasten to the attachment zone 5, which is shown as hollow cylinder 51 with the internal longitudinal ribs 52 and 53, a plate element, for example, a door panelling of a motor vehicle. The door panelling can be further secured, for instance, with the aid of fastening elements, which are not specifically shown, and which are inserted into the longitudinal recesses 46 and 47 of plate 4.

As a result of the connection in accordance with the invention, comprised of a specially designed upper part 1 and a holding piece 2, an improvement in tolerance compensation is produced. This is especially important in the motor vehicle industry and particularly in this case with respect to the attachment of a door panelling to the body of a motor vehicle since the connection is properly guaranteed even when subjected to substantial temperature cycling.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. In a connection between a support, specifically a part of a motor vehicle body, and a plate element, specifically a door panelling and have an upper part attachable to the plate element via an attachment zone, and a contact zone for a holding piece which is joinable with the support, the improvement wherein the contact zone of the upper part comprises a pair of pockets arranged one above the other, the uppermost pocket of said pair of pockets having a lower wall defined by a cross-piece that separates said uppermost pocket from the lowermost pocket of said pair of pockets with said lowermost pocket having a lower wall defined by a plate member, and the holding piece being equipped above the attachment zone with two flanges having differing elasticity for insertion into the pockets with said flanges arranged at an axial distance from each other such that one said flange is supported by the lower wall of the uppermost pocket and the other of said flanges is supported by the lower wall of the lowermost pocket.

2. A connection as defined in claim 1 wherein the upper flange has an elastic center zone and the lower flange is a rigid plate.

3. A connection as defined in claim 2 wherein the upper flange has an outer peripheral portion supported by resilient arms.

4. A connection as defined in claim 2 wherein the flanges are circular and the upper flange has a larger diameter than the lower flange.

5. A connection as defined in claim 2 wherein the flanges are joined to each other by a first connection neck and the lower of the two flanges is joined to the attachment zone by a second connection neck.

6. A connection as defined in claim 5 wherein the connection necks are cylindrical in shape and the first connection neck has a smaller diameter than the second connection neck.

7. A connection as defined in claim 6 wherein there is a circumferential, elastic sealing lip that joins to the second connection neck.

8. A connection as defined in claim 5 wherein the cross-piece and the plate member are respectively equipped with insertion slots for the connection necks and behind each of the insertion slots there is arranged a larger diameter aperture.

9. A connection as defined in claim 8 wherein the insertion slots taper inwardly.

10. A connection as defined in claim 8 wherein the contact zone has a rectangular outer configuration.

11. A connection as defined in claim 8 wherein the upper pocket of the contact zone has a greater height than the thickness of the upper flange of the holding piece.

12. A connection as defined in claim 8 wherein the height of the lower pocket of the contact zone corresponds to approximately the thickness of the lower flange of the holding piece.

13. A connection as defined in claim 1 including a circumferential, elastic sealing lip above the attachment zone.

14. A connection as defined in claim 8 wherein the attachment zone is an anchor or cylindrical base carrying elastic locking elements embeddable behind an aperture in the support.

15. A connection as defined in claim 1 wherein, above the contact zone of the upper part, there is a plate which joins to the attachment zone.

16. A connection as defined in claim 15 wherein the plate has a rectangular shape and is provided on both sides of the contact zone with longitudinal recesses.

17. A connection as defined in claim 1 wherein the attachment zone is a hollow cylinder.

18. A connection as defined in claim 17 wherein the hollow cylinder is equipped at the outer circumference with ribs and a traversing recess that extends longitudinally.

* * * * *